United States Patent [19]

Kramer

[11] 4,304,459
[45] Dec. 8, 1981

[54] REFLECTIVE HOLOGRAPHIC SCANNING SYSTEM INSENSITIVE TO SPINNER WOBBLE EFFECTS

[75] Inventor: Charles J. Kramer, Pittsford, N.Y.

[73] Assignee: Xerox Corporation, Stamford, Conn.

[21] Appl. No.: 54,377

[22] Filed: Jul. 2, 1979

[51] Int. Cl.³ .............................................. G02B 27/17
[52] U.S. Cl. ..................................... 350/3.71; 350/6.7
[58] Field of Search ................ 350/3.70, 3.71, 6.1, 350/6.5, 6.7, 6.9, 102, 162 R, 286

[56] References Cited

U.S. PATENT DOCUMENTS

| | | | |
|---|---|---|---|
| 3,614,193 | 10/1971 | Beiser | 350/3.71 X |
| 3,721,487 | 3/1973 | Pieuchard et al. | 350/3.71 |
| 3,897,132 | 7/1975 | Meeussen et al. | 350/6.7 |
| 3,953,105 | 4/1976 | Ih | 350/3.71 |
| 4,067,639 | 1/1978 | Kramer | 350/6.9 |
| 4,094,576 | 6/1978 | Heiling | 350/3.71 |
| 4,239,326 | 12/1980 | Kramer | 350/3.71 |
| 4,243,293 | 1/1981 | Kramer | 350/3.71 |

FOREIGN PATENT DOCUMENTS 2000321 1/1979 United Kingdom .

*Primary Examiner*—John D. Lee

[57] ABSTRACT

A holographic scanning system includes a reflective type holographic spinner having a plurality of diffraction gratings on its surface. A reconstruction wavefront incident on a non-grating surface of the spinner is reflected into a corrective optical element which displaces and redirects the wavefront so that it is incident at the grating at an angle corrected for the effects of spinner wobble.

13 Claims, 6 Drawing Figures

REFLECTIVE HOLOGRAPHIC SCANNING SYSTEM INSENSITIVE TO SPINNER WOBBLE EFFECTS

BACKGROUND OF THE INVENTION AND PRIOR ART STATEMENT

This invention relates to light spot scanning, and more particularly to scanning with a spot of light generated by a reflection holographic scanner.

The primary function of a scanning system is the controlled sampling, or restoration, of information. In an optical scanning system, the information is processed either in parallel by a light beam which can simultaneously illuminate many data sites, or sequentially by a beam which, due to its size, illuminates only a single data site at a time. Interest in sequential optical scanning has expanded in recent years, primarily because of new capabilities provided by laser light. Laser scanners are capable of generating high resolution images at high scan rates. Most of the scanning systems devised to manipulate a laser beam include a galvanometer, rotating mirror, acousto-optic element, or electro-optic element as the light deflector. It was first demonstrated in 1967 that a rotating hologram can also serve as a deflector element in an image scanning system.

Laser line scanners used for imaging applications are generally required to generate a repetitive single scan line. A problem which has been encountered with multi-faceted rotating mirror line scanners is that due to the facet-to-facet non-uniformities and spinner wobble, non-collinear multiple scan lines are formed. An obvious solution to this problem is to fabricate the spinner assembly to such precise mechanical and optical tolerances that the residual error does not detract from the desired level of image quality. The expense of this approach, however, is a decided disadvantage. Holographic scanning provides an alternative by which this problem can be minimized.

In a typical arrangement for making a flat holographic spinner, a point light source serves as the object and a normally incident plane light wave as the reference beam. When a hologram thus constructed is illuminated with a plane light wave which is the conjugate of the original reference beam, the hologram functions to reconstruct a wavefront which converges with or without the use of additional optical elements to form an image of the original point object light source. When the holographic spinner is then rotated about the axis of the reference beam, the reconstructed image spot scans a circle in space. This spot, however, is subject to perturbations created by mechanical wobble of the spinner.

The problem of spinner wobble effects has been previously addressed by Applicant in copending applications U.S. Ser. No.: 708,245 and 921,409 (now U.S. Pat. Nos. 4,239,326 and 4,243,293, respectively) which disclose solutions based on wobble invariance obtained through specific optical geometries. U.S. Pat. No. 4,067,639 and copending application U.S. Ser. No.: 921,411, (now abandoned) by the same Applicant, disclose spinner mounting techniques for reducing wobble.

SUMMARY

The present invention provides a scanning system utilizing a reflection holographic spinner which conditions a reconstruction wavefront so that it has reduced sensitivity, or is invariant, to the presence of wobble in the spinner. This conditioning is accomplished by directing a reconstruction wavefront onto a reflective portion of the spinner adjacent a reflection diffraction grating or facet. The reflected wavefront is directed to an optical element which conditions the wavefront and redirects it onto the grating. This redirected wavefront now contains any deviations in the reflected wavefront caused by spinner wobble. The wavefront diffracted from the grating generates a scan line at an image plane which is substantially invariant to the presence of spinner wobble during rotation.

Preferred embodiments of the optical element are provided and include various retro-reflectors such as corner cube reflectors, and various modifications of a corner cube reflector.

DRAWINGS

DESCRIPTION

Figure 1:
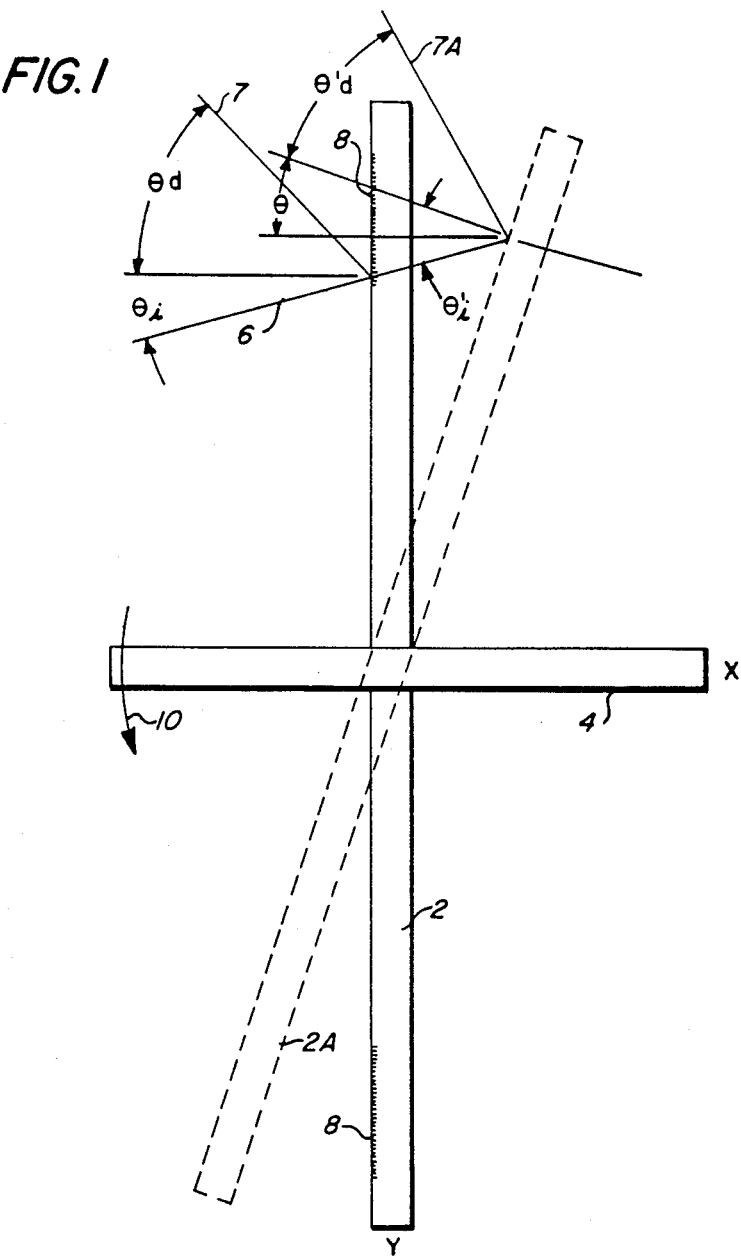
FIG. 1 is a schematic illustration demonstrating the effects of wobble on a rotatably mounted holographic spinner.

Referring now to FIG. 1, a holographic spinner 2 is shown mounted for rotation on a shaft 4. Spinner 2 is a reflective type spinner which has a plurality of holographic facets 8 formed along its periphery. Facets 8 can be zone-type lenses containing information for the reconstruction of a point source or they can be plane diffractive gratings which will diffract the incident reconstruction wavefront and rely upon later focusing elements to obtain a scanning spot. The spinner is driven by a suitable motor, not shown, in a direction indicated by arrow 10.

Reconstruction light beam 6 emanates from a laser or other source of coherent light. Light beam 6 is represented only by its principal ray, incident upon a holographic spinner at an angle $\theta_i$. The holographic facet 8 diffracts the light beam 6 at an angle of diffraction $\theta_d$.

In order to evaluate how the angular direction of a diffracted ray from a reflection holographic spinner is affected by tilting the spinner, two views of the spinner are depicted in FIG. 1, untilted spinner 2 and tilted spinner 2a. In the untilted orientation, the incident beam 6 and diffracted beam 7 have angles $\theta_i$ and $\theta_d$, respectively, with regard to the spinner normal. In the tilted orientation, the incident beam 6 and diffracted beam 7A have angles $\theta'_i$ and $\theta'_d$, respectively, with regard to the tilted spinner normal. As shown in FIG. 1, tilting of the spinner surface causes an associated tilting of the deflected beam with respect to the fixed XY coordinates which ultimately results in unwanted cross scan motion at an image plane. The change produced in the diffraction angle, $d\theta_d$ by tilting the spinner by the angle $d\theta$ for a reflection type spinner is:

$$d\theta_d = +\left[1 + \frac{\cos\theta_i}{\cos\theta_d}\right]d\theta \quad (1)$$

or, in more vigorous form:

$$d\theta_d = \left[1 + \frac{\cos(\theta_i - \theta)}{\cos(\theta_d - \theta)}\right]d\theta \quad (1A)$$

According to the present invention, it was realized that if the reconstruction wavefront were first reflected from a surface of the spinner adjacent the holographic facet any deviation produced by spinner wobble would be present in this reflected beam angle. Using this insight, it was apparent that various optical elements could be introduced to the system which could intercept and displace this first reflected beam to produce a second beam redirected to the active facet and corrected for the sensed deviations. FIGS. 2–6 illustrate several scanning systems employing various corrective optical elements.

Figure 2:
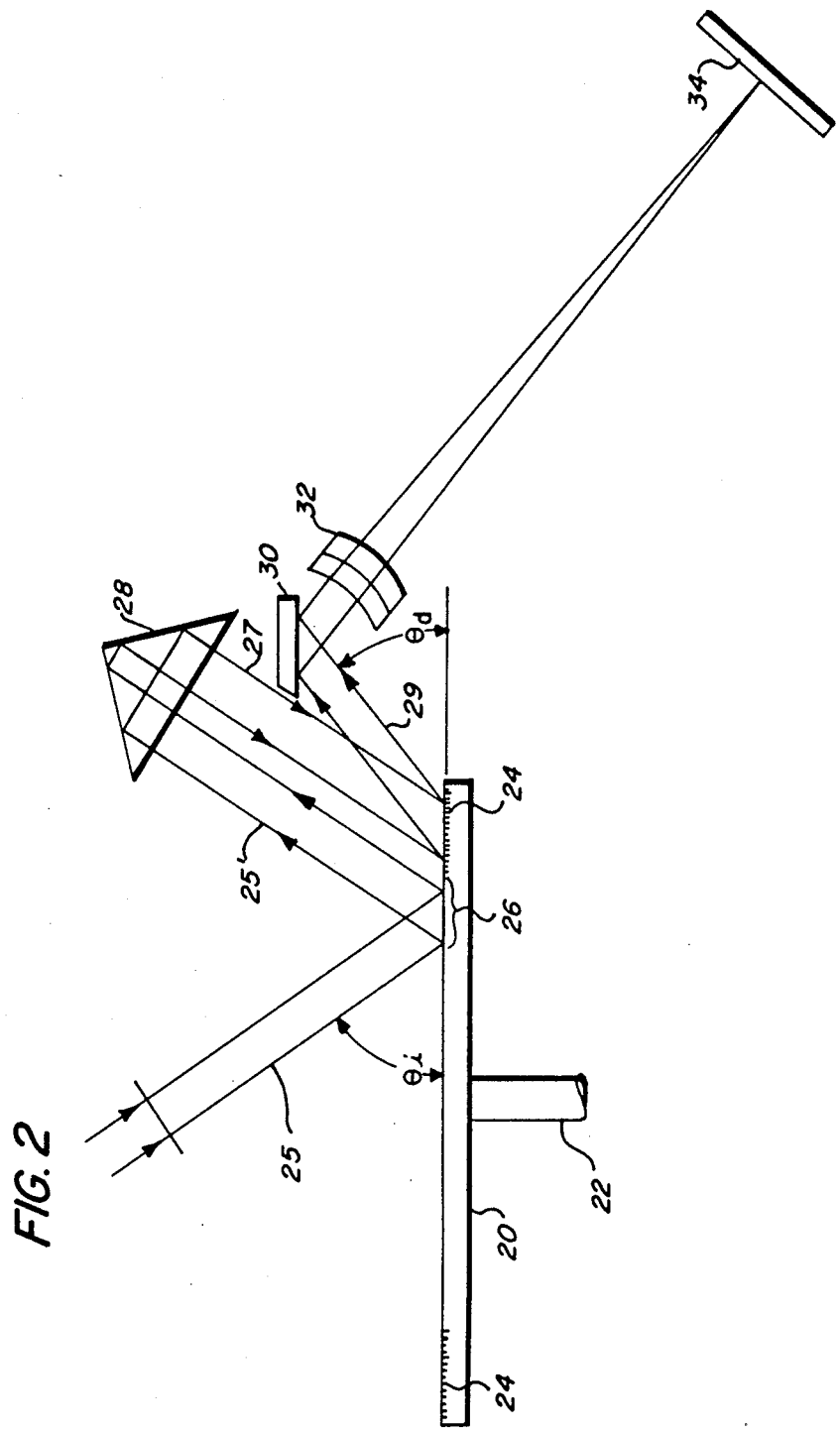
FIG. 2 shows a reflective-type spinner in a scanning system incorporating a corner cube reflector to reduce wobble effects according to the invention.

Referring to FIG. 2, spinner 20 rotatable about rotor axis 22, has a plurality of plane diffraction gratings 24 formed along the outer edge. Reconstruction wavefront 25 is incident on the surface of spinner 20 at area 26 which is adjacent a facet 24. Area 26 can consist of a discrete mirrored surface or can be part of a mirrored band extending around the spinner surface. Reflected incident wavefront 25' propagates to corner cube reflector 28. A corner cube reflector also known as a triple mirror reflector, has the retroreflective property that any ray entering the effective aperture will be reflected and emerge from the entrance/exit face parallel to itself but with opposite direction of propagation. Wavefront 25' is thus inverted, displaced and redirected as incident wavefront 27 onto facet 24. The beam is then diffracted as wavefront 29 which is reflected from folding mirror 30 and focused by lens 32 onto an image plane 34. As spinner 20 is rotated about shaft 22, grating 24 is rotated through the redirected wavefront 27 which produces a corresponding translation of the diffracted wavefront 29 and the generation of a single scan line at image plane 34. As additional gratings are rotated through the wavefront, additional scan lines are generated.

As is evident from FIG. 2, redirected beam 27 from corner cube 28 is incident on grating 24 at the same angle that incident reflected beam 25' made with the spinner. Any deviation present in beam 25' as a result of spinner wobble or for that matter for spinner substrate irregularities will be present in beam 27.

Incorporating information about the spinner surface deviations into the beam incident on the facet enables the final scan beam to be corrected for these surface deviations. When a feedback device such as the one depicted in FIG. 2 is utilized with the spinner, the equation for the change in the diffracted angle from the spinner as a function of tilt angle can be rewritten in the following form to include the effect of the feedback on the incidence beam:

$$d\theta_d = +\left[1 + (1 - 2X)\frac{\cos\theta_i}{\cos\theta_d}\right]d\theta \quad (2)$$

where the 2X term in this equation represents the multiplier factor introduced by the feedback process. The numerical value of the X part of this term depends on the feedback device used and is zero when no feedback mechanism is present. For the corner cube feedback arrangement shown in FIG. 2, X=1. It is evident from Eq. (2) that for this multiplier factor the system is only totally invariant to wobble for the case where $\theta_i = \theta_d$. This condition can be achieved for the case of a reflective spinner by positioning a beam splitter in the path of the beam incident on the facet. Even though it is a possible solution it is not an attractive solution from the standpoint of radiometric efficiency. In FIG. 2, $\theta_i$ is depicted as being equal to $\approx 30°$ while $\theta_d$ is depicted as being $\approx 50°$. When these values are substituted into Eq. (2), $d\theta_d = 0.35\alpha\theta$. The feedback arrangement in this system has not made it completely invariant to spinner wobble but has reduced its sensitivity to wobble by 6.76 times, compared with the same system without feedback.

In order for the feedback network to make the system completely invariant with regard to wobble, the following condition must be met:

$$X = \tfrac{1}{2}\left[1 + \frac{\cos\theta_d}{\cos\theta_i}\right] \quad (3)$$

Figure 3:
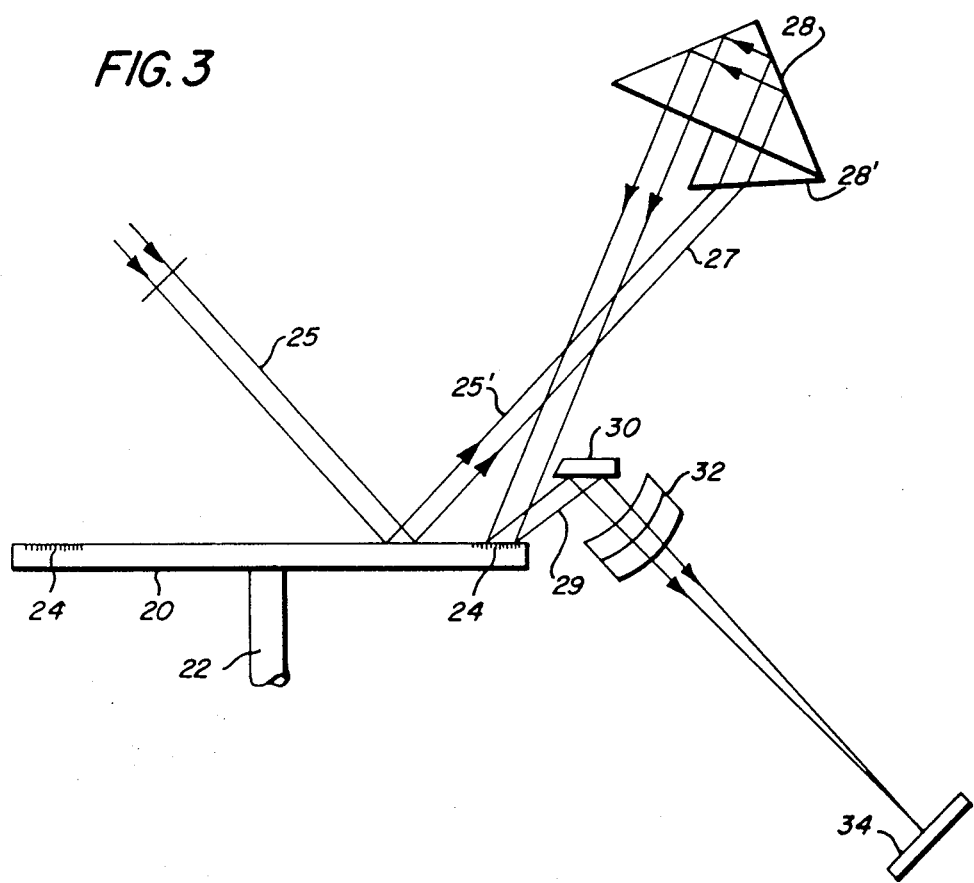
FIG. 3 illustrates the scanning system of FIG. 2 incorporating a prism corner cube assembly.
Figure 4:
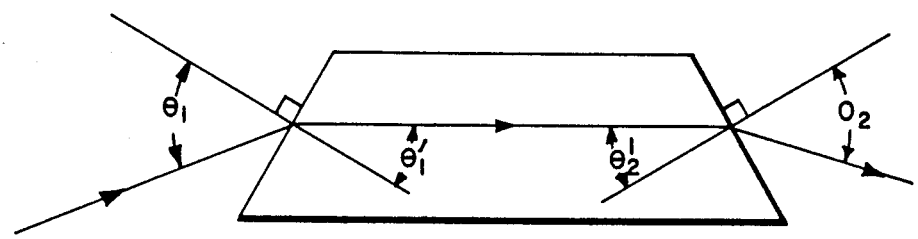
FIG. 4 illustrates the relationship between the change in the angle of a ray leaving a prism as a result of a change in the angle of the ray incident on the prism.

This condition can be achieved for the more general case of $\theta_i \neq \theta_d$ by altering the basic feedback arrangement illustrated in FIG. 2. One of a number of possible alterations is illustrated in FIG. 3. The basic difference between the systems in FIGS. 2 and 3 is the addition of a 30°-60°-90° prism 28' to corner cube reflector 28. By this addition the multiplier factor for the feedback network has been adjusted so that the system in FIG. 3 is invariant with regard to wobble for the incident and diffraction angles depicted. The change produced in the multiplier factor by the presence of prism 28' is determined by calculating the relationship between the change in angle of a ray leaving a prism as a result of a change in angle of the ray incident on the prism. This relationship is:

$$d\theta_2 = \frac{\cos\theta_1 \cos\theta_2'}{\cos\theta_1' \cos\theta_2}d\theta_1 \quad (4)$$

where $d\theta_1$ is the change in the input angle to the prism, $d\theta_2$ is the corresponding change in the output angle from the prism, $\theta_1$ is the angle that the ray makes at the first surface of the prism, $\theta_1'$ is the angle of the ray after refraction at the first surface of the prism, $\theta_2'$ is the angle of the ray at the second surface of the prism and $\theta_2$ is the angle of the ray after refraction at the second surface of the prism. These relationships are shown schematically in FIG. 4. With the aid of Eq. (4), the X term in the feedback multiplier factor for the prism corner cube assembly is shown to be:

$$X = \frac{\cos\theta_1 \cos\theta_2'}{\cos\theta_1' \cos\theta_2} \quad (5)$$

Figure 5:
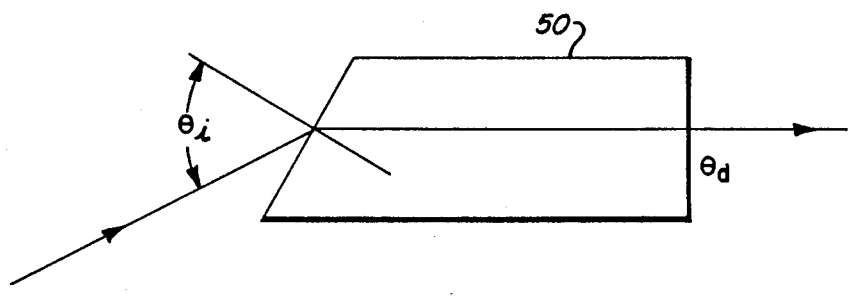
FIG. 5 is a representation of an equivalent prism formed by the prism-corner cube assembly of FIG. 3.

Invariance is achieved with the prism—corner cube feedback assembly when the right hand sides of Eqs. (3) and (5) are equivalent. If the indices of refraction of the prism and corner cube are chosen to be nearly equal, an equivalent prism 50 formed by the prism corner cube assembly in FIG. 3 is shown in FIG. 5. For the prism conditions depicted in FIG. 5, Eq. (5) reduces to:

$$X = \frac{\cos\theta_1}{\cos\theta_1'} \quad (6)$$

Combining the prism with the corner cube has a number of other benefits in addition to making the system more invariant with regard to wobble. As a result of the beam entering the prism at an oblique angle and leaving it normal to the last surface, the beam diameter in the sagittal plane (in the plane of FIG. 3) is increased. This increase compensates in whole or in part for the decrease in beam diameter that results from having different incident and diffraction angles at the facet. This compensation effect is illustrated in FIG. 3. The oblique incidence and normal exit provided by the prism permits the use of the feedback technique with a larger number of spinner configurations. It is apparent from an inspection of FIG. 2 that the feedback arrangement in this figure would be difficult to implement with a spinner having an incident beam which is normal to the facet surface. It is evident from FIG. 3 that a normal incidence beam presents no problem with this feedback arrangement.

Figure 6:
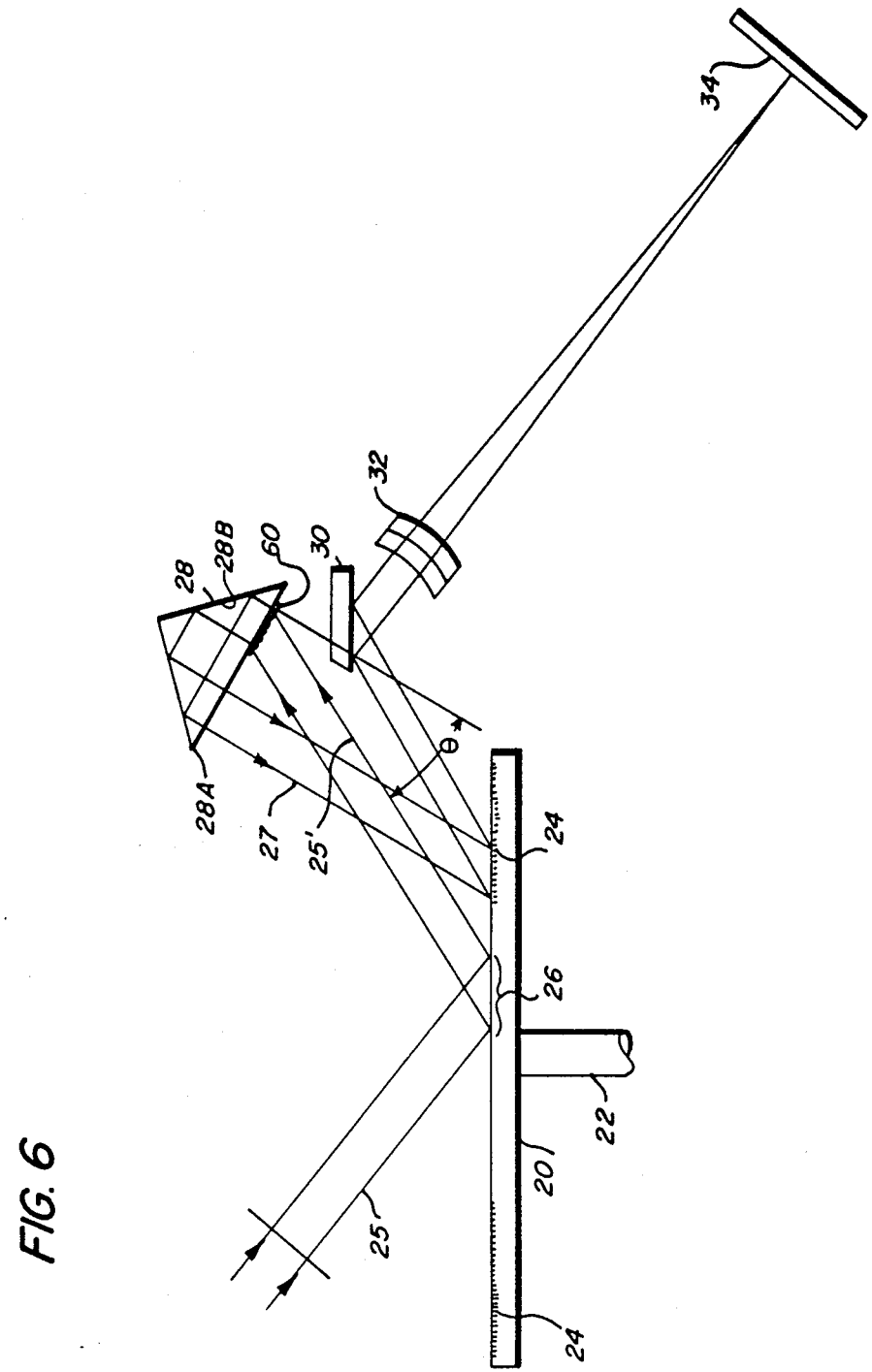
FIG. 6 illustrates the scanning system of FIG. 2 incorporating a corner cube with a transmission diffraction grating on one surface thereof.

Instead of utilizing a prism to modify the feedback multiplier factor, a diffraction grating could be used with the basic feedback geometry of FIG. 2 to intercept the beam at any position in the path between the point where the incident beam is first reflected from the spinner and the point where it is incident on the facet. FIG. 6 shows the system of FIG. 2 incorporating a transmission grating 60 formed on the surface 28A of corner cube reflector 28. In an alternative configuration (not shown), a reflective grating could be deposited on face 28B of the cube assembly.

If a grating element is utilized, the X term in the feedback multiplier is given by:

$$X = \frac{\cos\theta_i'}{\cos\theta_d'} \quad (7)$$

where $\theta_i'$ and $\theta_d'$ are, respectively, the angles of incidence and diffraction with regard to the grating feedback element.

Although use of a corner cube reflector as the corrective element is quite advantageous in terms of compactness and easy alignability because of its three dimensional retro-reflective properties, other retroreflective elements can be used. A "catseye" retroreflector is especially advantageous since it could also function as part of a prescan focusing element. This can be done by adjusting the mirror element with respect to the focal length of the lens so that exiting rays are either converging or diverging. Other elements such as a porro prism or its equivalent mirror assembly can be used but the scanner system would then be corrected for the effects of wobble in the cross scan direction when the roof edge is aligned parallel to the scan line, but not in the scan direction. The effect of wobble in the scan direction is to produce time base errors in the scan position.

What is claimed is:

1. A holographic scanning system including a reflection holographic spinner having on its surface at least one holographic facet;
    a source of coherent light which directs a reconstruction light wavefront, onto a portion of said spinner surface adjacent said facet at a first angle of incidence, $\theta_i$ said reconstruction wavefront being reflected from said surface;
    an optical element disposed in the path of said reflected wavefront, said element acting to condition said wavefront and redirect it onto said holographic facet at a second angle of incidence, said facet diffracting said wavefront at a first order diffraction angle $\theta_d$,
    means for rotating said spinner so that said facet is rotated across said reconstruction wavefront producing a corresponding translation of the diffracted wavefront, and
    means for focusing said diffracted wavefront, whereby a scan line is generated at an image plane which is substantially invariant to the presence of spinner wobble during rotation.

2. A holographic scanning system as defined in claim 1 wherein said optical element is a retroreflector.

3. A holographic scanning system as defined in claim 2 wherein said optical element is a corner cube reflector.

4. A holographic scanning system as defined in claim 2 wherein said optical element is a porro prism.

5. A holographic scanning system as defined in claim 2 wherein said optical element is a catseye retroreflector.

6. A holographic scanning system as defined in claim 5 wherein said facets are plane diffraction gratings and wherein said retroreflector forms part of a prescan focusing element.

7. A holographic scanning system as defined in claim 1 wherein said optical element is a feedback device which introduces a multiplier factor x into the redirected wavefront such that $$X = \tfrac{1}{2}\left[1 + \frac{\cos\theta_d}{\cos\theta_i}\right]$$

8. A holographic scanning system as defined in claim 7 wherein said optical element is a retroreflector including a prism located so that said reflected wavefront strikes a first surface of said prism at an angle $\theta_1$, is refracted at said first surface at an angle $\theta_1'$ strikes the second surface at an angle $\theta_2'$ and is refracted at said second surface at an angle $\theta_2$, the multiplier factor x being $$X = \frac{\cos\theta_1 \cos\theta_2'}{\cos\theta_1' \cos\theta_2}$$

9. A holographic scanning system as defined in claim 1 wherein said optical element includes a grating, said reflected wavefront incident on said grating at an angle $\theta_i'$ and diffracted by said grating at an angle $\theta_d'$, the feedback multiplier X of the element being given by the equation $$X = \frac{\cos\theta_i'}{\cos\theta_d'}$$

10. A holographic scanning system as defined in claim 1 wherein said first angle of incidence is equal to said diffraction angle and further including a beamsplitter positioned in the path of the redirected wavefront and adapted to pass a portion of the redirected wavefront through to the facet surface while subsequently reflecting a portion of said diffraction wavefront to generate the scan line.

11. A holographic scanning system as defined in claim 1 wherein said facets are zone-type lenses which diffract said redirected incident wavefront to reconstruct a spot light for scanning an image plane.

12. A holographic scanning system as defined in claim 1 wherein said facets are plane diffraction gratings which diffract an incident reconstruction wavefront into zeroth and first order components.

13. A holographic scanning system as defined in claim 12 further including means for focusing said first order component as a scanning spot on an image plane.

* * * * *